United States Patent
Valentin

(10) Patent No.: US 7,590,897 B2
(45) Date of Patent: Sep. 15, 2009

(54) DEVICE, METHOD AND COMPUTER PROGRAM PRODUCT FOR RESPONDING TO ERROR EVENTS

(75) Inventor: Gary Valentin, Tel-Aviv (IL)

(73) Assignee: International Business Machines Corporation, Armonk, NY (US)

( * ) Notice: Subject to any disclaimer, the term of this patent is extended or adjusted under 35 U.S.C. 154(b) by 400 days.

(21) Appl. No.: 11/671,487

(22) Filed: Feb. 6, 2007

(65) Prior Publication Data

US 2008/0189576 A1    Aug. 7, 2008

(51) Int. Cl.
*G06F 11/00*    (2006.01)
(52) U.S. Cl. .................................................. 714/48
(58) Field of Classification Search ............. 714/15–21, 714/25, 37–39, 47–49
See application file for complete search history.

(56) References Cited

U.S. PATENT DOCUMENTS

| | | | |
|---|---|---|---|
| 5,539,877 A * | 7/1996 | Winokur et al. ............... 714/26 |
| 6,128,730 A | 10/2000 | Levine | |
| 6,338,149 B1 | 1/2002 | Ciccone, Jr. et al. | |
| 6,539,338 B1 * | 3/2003 | Pickreign et al. ............ 702/185 |
| 6,629,316 B1 | 9/2003 | Curtis | |
| 6,745,344 B1 * | 6/2004 | Joshi et al. .................... 714/38 |
| 6,832,329 B2 * | 12/2004 | Ahrens et al. ................... 714/5 |
| 7,523,359 B2 * | 4/2009 | Richards et al. ............... 714/49 |
| 2002/0188711 A1 * | 12/2002 | Meyer et al. ................. 709/223 |

FOREIGN PATENT DOCUMENTS

WO    WO0116728 A2    3/2001

* cited by examiner

*Primary Examiner*—Nadeem Iqbal

(57) ABSTRACT

A method, system and computer program product for responding to error events are provided. The method includes: detecting a detected error event while executing a computer readable program; looking for a predefined response to the detected error event in a modifiable error event response data structure; validating the modifiable error event response data structure; and responding to the detected error event according to the predefined response if the modifiable error event response data structure is valid and if the modifiable error event response data structure includes the predefined response.

29 Claims, 5 Drawing Sheets

DEVICE, METHOD AND COMPUTER PROGRAM PRODUCT FOR RESPONDING TO ERROR EVENTS

FIELD OF THE INVENTION

The present invention relates to a method, a device and a computer program product for responding to error events.

BACKGROUND OF THE INVENTION

Modern systems, such as servers, storage servers, disk arrays and the like, may include a large amount of monitored entities. The monitored entities can include processors, memory units, device adapters, host adapters, chipsets, fans, batteries, display panels, expansion units, firmware entities, microcode entities and the like. These monitored entities can malfunction and some monitored entities can be removed from the system, added to the system, updated and the like.

Usually, monitored entity malfunctions as well as monitored entity replacement, additions or removal are regarded as error events that are monitored by a system management software. The system management software includes a list of responses to detected error events. The system management software is usually a part of a computer program that is executed by the system. The computer program is usually very large and complex. Accordingly, computer program updates are not performed very frequently.

In many occasions the number of error events and error event types is very big, and the responses to these error events do not match the requirements of a system administrator (or other user of the system). In addition, the error events themselves can change at a rate that well exceeds the modification rate of the computer program.

There is a need to be able to make responses adjustments tunable and modifiable, without needing to upgrade the entire computer program product. There is a need to allow response modifications possible but controllable.

There is a need to provide efficient methods, computer program products and system for effectively responding to error events.

SUMMARY OF THE PRESENT INVENTION

A method for responding to error events is provided. The method includes: detecting a detected error event while executing a computer readable program; looking for a predefined response to the detected error event in a modifiable error event response data structure; validating the modifiable error event response data structure; and responding to the detected error event according to the predefined response if the modifiable error event response data structure is valid and if the modifiable error event response data structure includes the predefined response.

Conveniently the validating includes performing a binary validation test.

Conveniently the validating includes performing a checksum operation.

Conveniently the validating includes performing a decryption operation using a predefined key.

Conveniently the modifiable error event response data structure is associated with a certain relevancy value and wherein the validating includes checking a relationship between the certain relevancy value and between a relevancy value associated with the computer readable program.

Conveniently the method further includes responding to the detected error event according to the predefined response if the modifiable error event response data structure is invalid and if the modifiable error event response data structure includes the predefined response; and generating an invalidity indication.

Conveniently the method further includes ignoring a second predefined response to the detected error event in the computer readable program if the modifiable error event response data structure is valid and if the modifiable error event response data structure includes the predefined response.

Conveniently the method further includes receiving a modification request of the modifiable error event response data structure; evaluating a fulfillment of a modification criterion and accepting the modification request if the modification criterion is fulfilled.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

Conveniently, responses to error events can be dynamically updated by providing and utilizing a modifiable error event response data structure. The modifiable error event response data structure (MEERDS) can be frequently updated. Before responding according to a response stored in MEERDS the validity of MEERDS is checked. If MEERDS is not valid it can be ignored, thus preventing responses based upon unauthorized alterations of MEERDS. A modification of MEERDS is allowed if a modification criterion is fulfilled. The MEEDRS can be modified by authorized persons that can provide the required modification criterion.

According to other embodiments of the invention a modifiable system characteristic data structure is provided. It can include modified system parameters, such as but not limited to such as sizes of memory, number of threads, retry-counts, etc. Before applying a system parameter the computer program product executed by the system checks its validity. If the modifiable system characteristic data structure is valid then the modified system parameter can be applied. The modifiable system characteristic data structure can be modified by authorized persons that can provide the required modification criterion.

By using the MEERDS there is no need to re-compile a new version of the whole computer program product, test it and send it out. Simple changes, such as changes in responses to error events can be easily provided to the customer and various authorized persons can change these responses in a simple manner.

According to an embodiment of the invention if a response is based upon the MEEDRS a modified response indication can be generated. The notification can be viewed by the user of the system that implements the modified response, to a central monitoring system, to a manufacturer of the computer program product, and the like.

Figure 1:
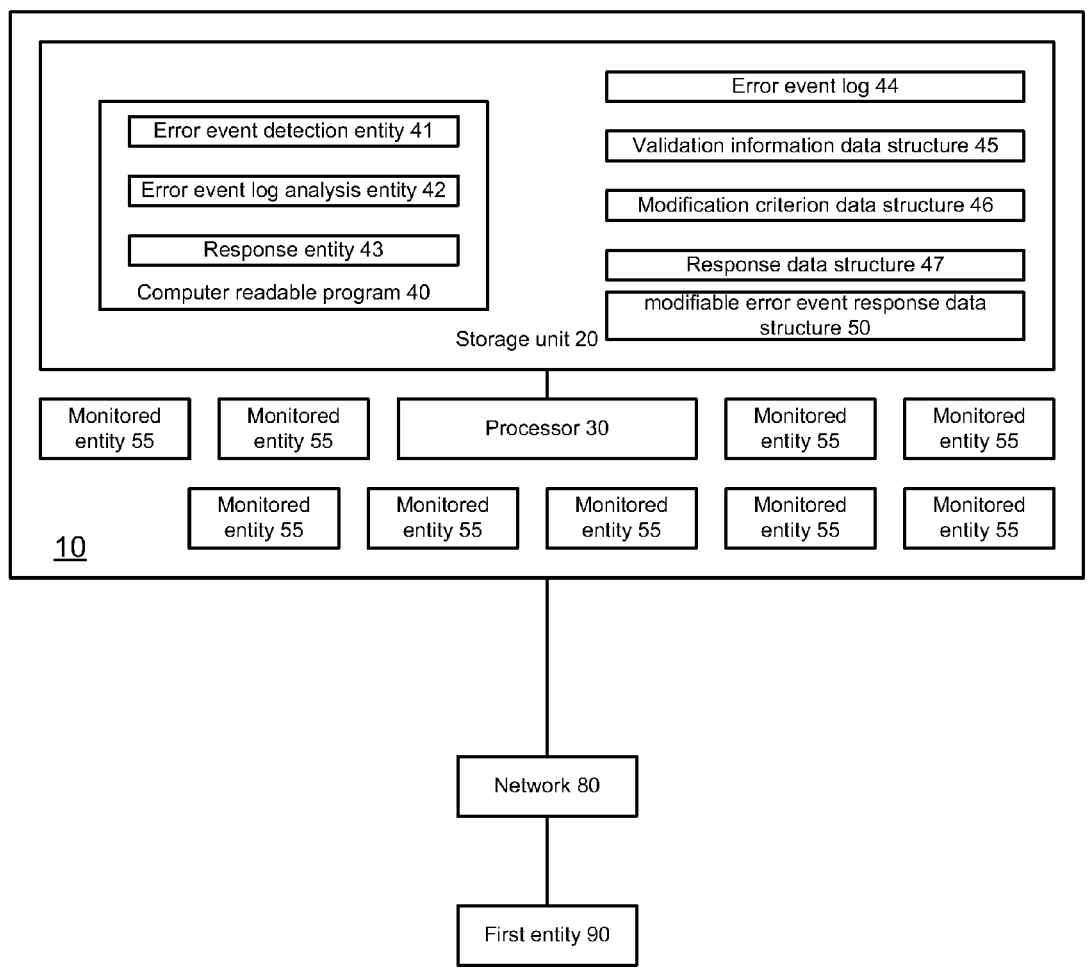
FIG. 1 illustrates a system having error event response capabilities, according to an embodiment of the invention.

FIG. 1 illustrates system 10 according to an embodiment of the invention.

System 10 includes storage unit 20, processor 30 and multiple monitored entities 55. These multiple monitored entities can be software entities, hardware entities, firmware entities and the like. It is noted that storage unit 20 and processor 30 can also be regarded as monitored entities.

Storage unit 20 stores computer readable program 40 and modifiable error event response data structure (MEERDS) 50.

Processor 30 can access storage unit 20 and execute computer readable program 40. Computer readable program 40 can include an error event detection entity 41, an error event log analysis entity 42, and a response entity 43. Storage unit 20 can also store additional data structures such as error event log 44, validation information data structure 45, modification criterion data structure 46, response data structure 47, and the like.

Error event log 41 can include a list of detected error events as well as various information on each error event. Response data structure 47 can include responses to various error events. It is associated with computer readable program 40 and is characterized by a low update rate.

Processor 30 can access any of the mentioned above data structures and can implement (when executing computer program product) the mentioned above entities. Accordingly, processor 30 can detect error events, respond to error events and even allow modifications of MEERDS 50.

Processor 30 is adapted to: (i) detect a detected error event while executing computer readable program 40; (ii) look for a predefined response to the detected error event in MEERDS 50; (iii) validate MEERDS 50; and (iv) respond to the detected error event according to the predefined response if MEERDS 50 is valid if MEERDS 50 includes the predefined response.

It is noted that a response can be characterized by one or more error thresholds that indicate the number of error events that should occur in order to trigger one or more response operations.

According to an embodiment of the invention the processor is adapted to validate MEERDS 50 by performing a binary validation test. The test can be a checksum test, an encryption attempt (that may fail or succeed), and the like. The checksum can be applied on MEERDS 50 or only on a portion of MEERDS 50. The checksum can be applied on MEERDS 50 or on a portion (one or more fields) of MEERDS to provide a first checksum result. The first checksum result can be compared to another predefined checksum result and the comparison will indicate that MEERDS is valid or invalid.

According to an embodiment of the invention MEERDS 50 is associated with a certain relevancy value and processor 30 is adapted to validate MEERDS 50 by checking a relationship between the certain relevancy value and between a relevancy value associated with computer readable program 40. The relevancy value can be a secret key used during the calculation of the checksum.

According to various embodiments of the invention the relevancy value can be a computer readable program, an identifier (such as system identification number, system type) of system 10, and the like.

Conveniently, processor 40 can respond to the detected error event according to the predefined response and to generate an invalidity indication if MEERDS 50 is invalid but includes the predefined response. It is noted that such a response (despite an invalidity of MEERDS) can be limited to certain responses, to certain invalidities and the like.

By responding to detected error events according to the responses within MEERDS 50 processor 30 can ignore predefined responses (such as responses stored within response data structure 47).

According to an embodiment of the invention MEERDS 50 can be modified by persons that access system 10.

In order to limit unauthorized modifications processor 30 can check whether to accept a modification request. Accordingly, processor 30 can: receive a modification request of MEERDS, evaluate a fulfillment of a modification criterion and accept the modification request if the modification criterion is fulfilled. The modification criterion is usually provided by the entity (for example first entity 90) that also provided MEERDS 50.

FIG. 1 also illustrates network 80 that connects system 10 to first entity 90.

First entity 90 can be the source of MEERDS 50. First entity 90 can also be a provider of computer readable product 40.

Figure 2:
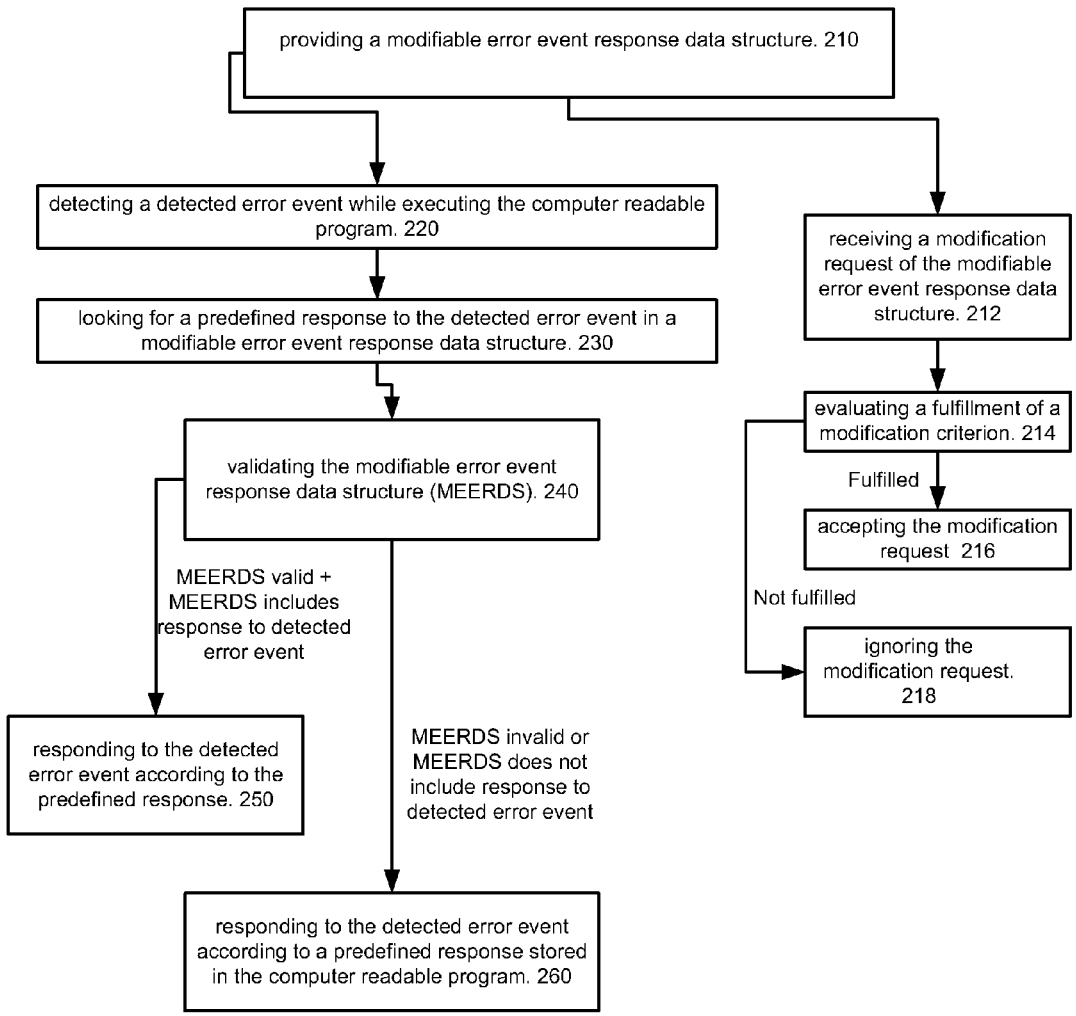
FIGS. 2-5 illustrate methods for responding to an error event, according to various embodiments of the invention.

FIG. 2 illustrates a method for responding to error events, according to an embodiment of the invention.

Method 200 starts by stage 210 of providing a modifiable error event response data structure. Stage 210 may include providing the modifiable error event response data structure over a network, by copying the content of a storage unit (such as disk, disk-on key, diskette, tape, and the like). It is noted that stage 210 may be repeated multiple times.

The provision of a modifiable error event response data structure (MEERDS) can occur after a provision of a computer readable program to a computer readable program executing system. It is noted that the MEERDS can include error events and the responses to error events but may also include error events and links to the responses.

Stage 210 can be followed by stages 220 and 212. Stage 212 includes receiving a modification request of the modifiable error event response data structure. Stage 212 is followed by stage 214 of evaluating a fulfillment of a modification criterion. Stage 214 is followed by stages 216 and 218. Stage 216 includes accepting the modification request if the modification criterion is fulfilled. Stage 218 includes ignoring the modification request.

Conveniently, stage 214 includes checking if a suggested response equals a response that exists at the computer readable program and preventing such a modification. Thus, the execution of stages 214-218 can generate a MEERDS that includes predefined responses that differ from responses included in the computer readable program.

Stage 220 includes detecting a detected error event while executing the computer readable program. The error event can be a certain error, a replacement of a certain component of the computer readable program executing system, an addition of a component to the computer readable program executing system and the like.

Stage 220 is followed by stages 230 and 240. These stages can be executed in a serial manner or in a parallel manner. For simplicity of explanation stage 240 is illustrated as following stage 230.

Stage 230 includes looking for a predefined response to the detected error event in a modifiable error event response data structure.

Stage 240 includes validating the modifiable error event response data structure.

Stage 240 can be followed (in response to the results obtained from the execution of stage 230 and 240) by stages 250 or 260.

Stage 250 includes responding to the detected error event according to the predefined response. Stage 240 is followed by stage 250 if the MEERDS is valid and if the MEERDS includes the predefined response.

Stages 240 and 250 enable to ignore responses (to detected error events) that are associated with the computer readable program. This can allow a user to filter error reports, prevent error indication from being surfaced and the like. The MEERDS can be useful when a user wishes to see fewer error indications or if the user does not regard a certain error event to be a significant error.

Stage 260 includes of responding to the detected error event according to a predefined response stored in the computer readable program. Stage 240 is followed by stage 260 if the MEERDS does not include a response to the detected error event.

According to various embodiments of the invention stage 240 is controlled by the computer readable program. Stages 240 may include any of the following operations, as well as a combination thereof: (i) performing a binary validation test; (ii) performing a checksum operation; (iii) performing a decryption operation using a predefined key; (iv) checking a relationship between a certain relevancy value associated with the MEERDS and between a relevancy value associated with the computer readable program; (v) checking a relationship between a computer readable program version associated with the MEERDS and between a version of the computer readable program; and (vi) checking a relationship between a computer readable program executing system identification number associated with the MEERDS and between a computer readable program executing system identification number.

According to an embodiment of the invention a first entity (such as the manufactory of the computer program product) can be informed once an error event is responded by a response included in the MEERDS. Additionally or alternatively, the first entity can be informed once the MEERDS is installed.

According to an embodiment the first entity is informed when the response is based upon the MEERDS. Thus, method 200 may include generating a modified response indication if responding according to the modifiable error event response data structure.

Figure 3:
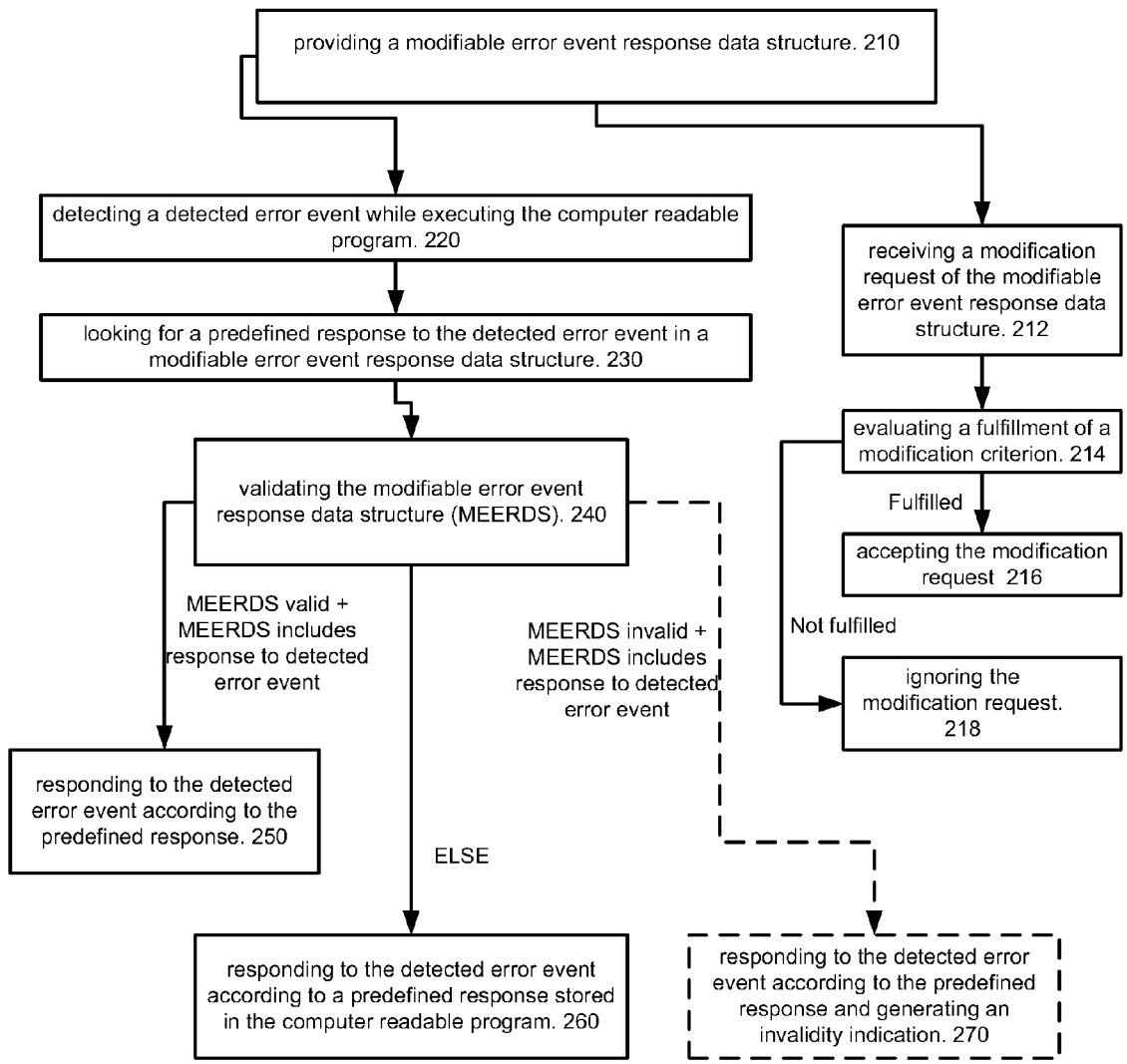

FIG. 3 illustrates method 201 for responding to error events, according to an embodiment of the invention.

Method 201 differs from method 200 of FIG. 2 by including stage 270. Stage 270 includes responding to the detected error event according to the predefined response in the MEERDS and generating an invalidity indication. Stage 240 is followed by stage 270 if the MEERDS is invalid but it includes the predefined response.

Figure 4:
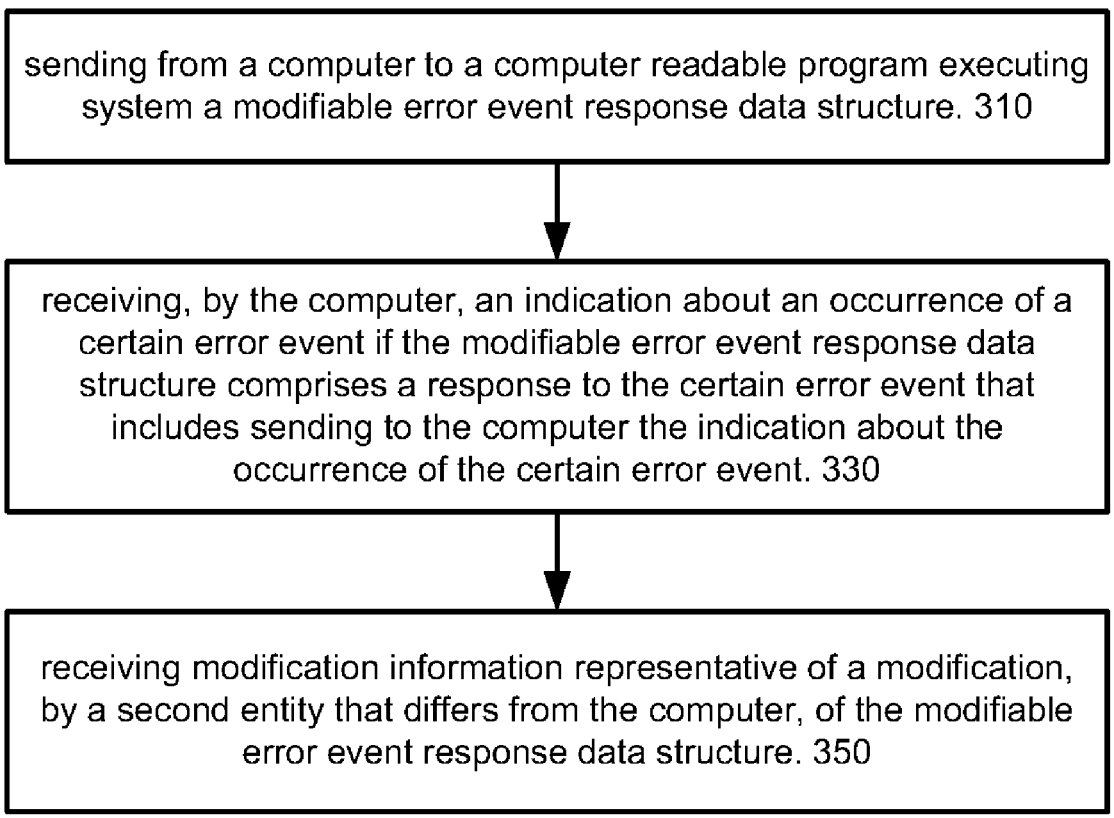

FIG. 4 illustrates method 300 for responding to error events, according to an embodiment of the invention.

The MEERDS can be provided to a system such as system 10. The computer can generate the MEERDS but this is not necessarily so. In various cases that computer should receive indications about various error events, modification of the MEERDS and the like. Method 300 provides such an alternative.

Method 300 starts by stage 310 of sending from a computer to a computer readable program executing system a modifiable error event response data structure.

It is noted that the computer readable program executing system can execute any stage of method 200.

Stage 310 is followed by stage 330 of receiving, by the computer, an indication about an occurrence of a certain error event. Thus may occur if one of the predefined responses of the MEERDS includes sending to the computer the indication about the occurrence of the certain error event.

Conveniently, stage 330 includes sending the MEERDS over a network.

Conveniently, stage 330 includes sending validation information to be used for validating, by the computer readable program executing system, the modifiable error event response data structure.

Stage 310 can also be followed by stage 350 of receiving modification information representative of a modification, by a second entity that differs from the computer, of the modifiable error event response data structure.

Figure 5:
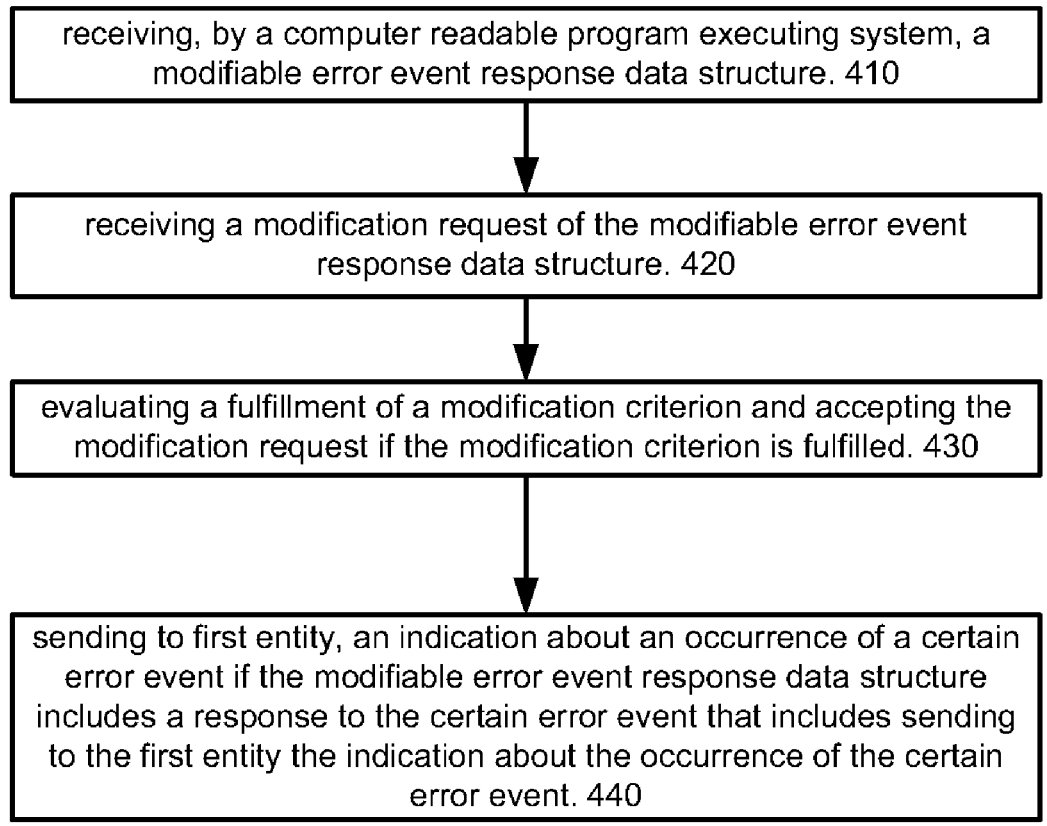

FIG. 5 illustrates method 400 for responding to error events, according to an embodiment of the invention.

In various cases the MEERDS should be modified not by a first entity (such as a computer) that generated the MEERDS but rather should be modified by one or more entities that (such as field technicians) that can access the system (so called computer readable program executing system) that executes the computer readable code.

Method 400 starts by stage 410 of receiving, by a computer readable program executing system, a modifiable error event response data structure.

Stage 410 is followed by stage 420 of receiving a modification request of the modifiable error event response data structure. The modification request can be provided, directly or indirectly, by a technician or another person that wishes to update MEERDS.

Stage 420 is followed by stage 430 of evaluating a fulfillment of a modification criterion and accepting the modification request if the modification criterion is fulfilled.

Stage 400 can also include stage 440 of sending to first entity, an indication about an occurrence of a certain error event if the MEERDS includes a response to the certain error event that includes sending to the first entity the indication about the occurrence of the certain error event.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

According to an embodiment of the invention data is written to a write-back cache unit, and current as well and previous data versions are sent to one or more storage units such as disks, disk arrays, tapes and the like. The data storage policy helps to refresh the data as well as the metadata and also assists in determining whether to send a certain data version to the disk or not.

Variations, modifications, and other implementations of what is described herein will occur to those of ordinary skill in the art without departing from the spirit and the scope of the invention as claimed.

Accordingly, the invention is to be defined not by the preceding illustrative description but instead by the spirit and scope of the following claims.

I claim:

1. A method for responding to error events, the method comprising:
   detecting a detected error event while executing a computer readable program;
   looking for a predefined response to the detected error event in a modifiable error event response data structure;
   validating the modifiable error event response data structure; and
   responding to the detected error event according to the predefined response if the modifiable error event response data structure is valid and if the modifiable error event response data structure comprises the predefined response.

2. The method according to claim 1 wherein the validating comprises performing a binary validation test.

3. The method according to claim 1 wherein the validating comprises performing a checksum operation.

4. The method according to claim 1 wherein the validating comprises performing a decryption operation using a predefined key.

5. The method according to claim 1 wherein the modifiable error event response data structure is associated with a certain relevancy value and wherein the validating comprises checking a relationship between the certain relevancy value and between a relevancy value associated with the computer readable program.

6. The method according to claim 1 further comprising responding to the detected error event according to the predefined response if the modifiable error event response data structure is invalid and if the modifiable error event response data structure comprises the predefined response; and generating an invalidity indication.

7. The method according to claim 1 further comprising ignoring a second predefined response to the detected error event in the computer readable program if the modifiable error event response data structure is valid and if the modifiable error event response data structure comprises the predefined response.

8. The method according to claim 1 further comprising receiving a modification request of the modifiable error event response data structure; evaluating a fulfillment of a modification criterion and accepting the modification request if the modification criterion is fulfilled.

9. The method according to claim 1 further comprising generating a modified response indication if responding according to the modifiable error event response data structure.

10. A computer program product comprising a computer usable medium including a computer readable program, wherein the computer readable program when executed on a computer causes the computer to:
    detect a detected error event;
    look for a predefined response to the detected error event in a modifiable error event response data structure;
    validate the modifiable error event response data structure; and
    respond to the detected error event according to the predefined response if the modifiable error event response data structure is valid and if the modifiable error event response data structure comprises the predefined response.

11. The computer program product according to claim 10, wherein the computer readable program when executed on a computer causes the computer to perform a binary validation test.

12. The computer program product according to claim 10, wherein the computer readable program when executed on a computer causes the computer to perform a checksum operation.

13. The computer program product according to claim 10, wherein the computer readable program when executed on a computer causes the computer to perform a decryption operation using a predefined key.

14. The computer program product according to claim 10, wherein the computer readable program when executed on a computer causes the computer to check a relationship between a certain relevancy value associated with the modifiable error event response data structure and between a relevancy value associated with the computer readable program.

15. The computer program product according to claim 10, wherein the computer readable program when executed on a computer causes the computer to respond to the detected error event according to the predefined response and to generate an invalidity indication if the modifiable error event response data structure is invalid and if the modifiable error event response data structure comprises the predefined response; and generating an invalidity indication.

16. The computer program product according to claim 10, wherein the computer readable program when executed on a computer causes the computer to ignore a second predefined response to the detected error event in the computer readable program if the modifiable error event response data structure is valid and if the modifiable error event response data structure comprises the predefined response.

17. The computer program product according to claim 10, wherein the computer readable program when executed on a computer causes the computer to receive a modification request of the modifiable error event response data structure; evaluate a fulfillment of a modification criterion and accept the modification request if the modification criterion is fulfilled.

18. A system having error event response capabilities, the system comprises:
    a storage unit adapted to store a computer readable program and a modifiable error event response data structure; and
    a processor, adapted to:
    (i) detect a detected error event while executing a computer readable program;
    (ii) look for a predefined response to the detected error event in a modifiable error event response data structure;
    (iii) validating the modifiable error event response data structure; and
    (iv) respond to the detected error event according to the predefined response if the modifiable error event response data structure is valid and if the modifiable error event response data structure comprises the predefined response.

19. The system according to claim 18 wherein the processor is adapted to validate the modifiable error event response data structure by performing a binary validation test.

20. The system according to claim 18 wherein the modifiable error event response data structure is associated with a certain relevancy value and wherein the processor is adapted to validate the modifiable error event response data structure by checking a relationship between the certain relevancy value and between a relevancy value associated with the computer readable program.

21. The system according to claim 18 wherein the processor is adapted to respond to the detected error event according to the predefined response and to generate an invalidity indication if the modifiable error event response data structure is invalid and if the modifiable error event response data structure comprises the predefined response.

22. The system according to claim 18 wherein the processor is adapted to ignore a second predefined response to the detected error event in the computer readable program if the modifiable error event response data structure is valid and if the modifiable error event response data structure comprises the predefined response.

23. The system according to claim 18 wherein the processor is adapted to: receive a modification request of the modifiable error event response data structure; evaluate a fulfillment of a modification criterion and accept the modification request if the modification criterion is fulfilled.

24. A method for responding to error events, the method comprises:
    sending from a computer to a computer readable program executing system a modifiable error event response data structure; and
    receiving, by the computer, an indication about an occurrence of a certain error event if the modifiable error event response data structure comprises a response to the certain error event that includes sending to the computer the indication about the occurrence of the certain error event.

25. The method according to claim 24 wherein the sending comprises sending the modifiable error event response data structure over a network.

26. The method according to claim 24 wherein the sending comprises sending validation information to be used for validating, by the computer readable program executing system, the modifiable error event response data structure.

27. The method according to claim 24 further comprising receiving modification information representative of a modification, by a second entity that differs from the computer, of the modifiable error event response data structure.

28. A method for responding to error events, the method comprising:
    receiving, by a computer readable program executing system, a modifiable error event response data structure;
    receiving a modification request of the modifiable error event response data structure; and
    evaluating a fulfillment of a modification criterion and accepting the modification request if the modification criterion is fulfilled.

29. The method according to claim 28 further comprising sending to first entity, an indication about an occurrence of a certain error event if the modifiable error event response data structure comprises a response to the certain error event that includes sending to the first entity the indication about the occurrence of the certain error event.

* * * * *